US008762355B2

(12) United States Patent  (10) Patent No.: US 8,762,355 B2
Gutjahr et al.  (45) Date of Patent: Jun. 24, 2014

(54) GENERATING CONFIGURATION FILES

(75) Inventors: Bernd Gutjahr, Ostelsheim (DE); Roland Heumesser, Rottenburg (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 1609 days.

(21) Appl. No.: 12/018,514

(22) Filed: Jan. 23, 2008

(65) Prior Publication Data
US 2008/0183746 A1 Jul. 31, 2008

(30) Foreign Application Priority Data

Jan. 30, 2007 (EP) ..................................... 07101424

(51) Int. Cl.
*G06F 17/30* (2006.01)
(52) U.S. Cl.
USPC .......................................... 707/705; 707/756
(58) Field of Classification Search
USPC .................................................. 707/705, 756
See application file for complete search history.

(56) References Cited

U.S. PATENT DOCUMENTS

| 6,598,057 | B1 | 7/2003 | Synnestvedt et al. |
| 2003/0005104 | A1 | 1/2003 | Deboer et al. |
| 2004/0054610 | A1 * | 3/2004 | Amstutz et al. ................. 705/36 |
| 2006/0075001 | A1 | 4/2006 | Canning et al. |
| 2006/0265689 | A1 * | 11/2006 | Kuznetsov et al. ............ 717/117 |
| 2007/0083599 | A1 * | 4/2007 | Provo ............................ 709/206 |
| 2007/0265812 | A1 * | 11/2007 | Verseput et al. .................. 703/2 |
| 2008/0159140 | A1 * | 7/2008 | Robinson et al. ............. 370/232 |
| 2009/0138415 | A1 * | 5/2009 | Lancaster ...................... 706/11 |

OTHER PUBLICATIONS

Krishna, et al., "Model-Driven Techniques for Evaluating the QoS of Middleware Configurations for DRE Systems", RTAS Symposium 2005, Mar. 2005, pp. 180-189, XP010779544.

* cited by examiner

*Primary Examiner* — Kim Nguyen

(57) ABSTRACT

A method of generating a configuration file is disclosed. According to an embodiment of the invention, the configuration file specifies how an object of a plurality of objects is to be monitored by an agent of an operational management system. The method comprises the step of providing a data file comprising a plurality of parameter settings for a plurality of parameters used to monitor the plurality of objects of the operational management system. The method in accordance with the invention further comprises the step of retrieving a subset of parameter settings from the plurality of parameter settings, wherein the retrieved subset of parameter settings provides specifications for a subset of parameters of the plurality of parameters, wherein the subset of parameters is used to monitor the object. In a further step the configuration file is generated by integrating the subset of parameter settings into a template, wherein the template comprises the subset of parameters, and wherein the parameter settings are assigned to the corresponding parameters.

10 Claims, 3 Drawing Sheets

GENERATING CONFIGURATION FILES

FIELD OF THE INVENTION

The invention relates to a method of generating a configuration file, to a computer program product for generating a configuration file, and to a data processing system.

BACKGROUND

Operational management is applied for the maintenance and the administration of computer systems and applications running on computer systems. Operational management is further applied to networks, in particular to large scale networks such as large scale computer and telecommunications networks, and refers to the maintenance and administration of such networks. Operational management can be understood as the execution of a set of functions required for controlling, planning, allocating, deploying, coordinating, and monitoring the resources of a network, a computer system, or an application. This includes, for example, performing functions such as initial network planning, frequency allocation, predetermined traffic routing to support load balancing, cryptographic key distribution authorization, configuration management, forward management, security management, performance management, bandwidth management, and accounting management.

In order to carry out operational management, an operational management system is typically employed. An operational management system comprises operational management software. The operational management software of an operational management system used to monitor a network is executed by a computer in the network. An operator/administrator of the network is then able to interact with the operational management system via a human machine interface provided by the operational management system. Software and hardware components which are managed and monitored by the operational management system are represented within the operational management system as objects.

The operational management system further comprises a central management server and one or more agents. An agent is a software component and can be seen as part of the operational management software. An agent is used to monitor an object defined in the operational management system. In order to do this, the agent is installed on the component relating to the object, or if the corresponding component is itself a software component, the agent is installed on the hardware component hosting the software component.

An agent monitors the corresponding object according to specifications given to the agent via one or more configuration files. A configuration file is also called a policy file or simply a policy. A configuration file contains detailed technical information on how the object is to be monitored. Parts of the technical information are parameters and parameter settings according to which the object is monitored.

An object might for example relate to a router of a network. A parameter specified in the technical information of the configuration file might then relate to the maximal data rate allowed to flow through the router. The corresponding parameter setting might specify the data rate to be 5 Megabytes (MB) per second. The agent then monitors the router and sends, for example by use of the simple network management protocol (SNMP), the management interface protocol (CMIP) or the Java management extensions (JMX), an alarm message to the operational management system in case the actual data rate through the router exceeds the maximum allowed data rate. The network management software of the network management system further alerts then the system administrator for example via the human machine interface.

Different agents require different configuration files with respect to the technical data they provide and even with respect to the file format and the internal structure of the data files. The provision of the configuration files from the central management server to the agents of the operational management system requires therefore a relative large amount of resources as the operator must set up each configuration file separately for each application or managed resource monitored by an agent. Furthermore each configuration file must be provided separately in the correct structure and format to the corresponding agent.

There is therefore a need for an improved method of generating a configuration file. Accordingly, there is a need for an improved data processing system for generating a configuration file.

SUMMARY OF THE INVENTION

According to a first aspect of the invention, there is provided a method of generating a configuration file. In accordance with an embodiment of the invention, the configuration file specifies how an object of a plurality of objects is to be monitored by an agent of an operational management system. The method in accordance with the invention comprises the step of providing at least a data file comprising a plurality of parameter settings for a plurality of parameters used to monitor the plurality of objects of the operational management system. In a further step, a subset of parameter settings is retrieved from the plurality of parameter settings. The retrieved subset of parameter settings provides specifications for a subset of parameters of the plurality of parameters, wherein the subset of parameters is used to monitor the object. In a further step, the configuration file is generated by integrating the subset of parameter settings into a template, wherein the template comprises the subset of parameters, and wherein the parameter settings are assigned to the corresponding parameters.

The subset of parameter settings is thus retrieved from a data file and incorporated into a template that comprises the corresponding parameters. Hence the parameter settings and the corresponding parameters are provided separately as the subset of parameter settings is retrieved from the data file and as the parameters are kept in the template. This improves the clarity of the parameter and parameter settings for the administrator and also facilitates the inspection of the parameter settings as all parameter settings can be kept on, e.g., a database from where they are provided via the data file.

In order to monitor objects that relate, e.g., to network components of the same type, the same parameters are typically employed. For example, agents might monitor routers by measuring the actual data rates flowing through the routers and by comparing the data flow rates with maximal allowed data rates. The values (parameter settings) for the maximal allowed data rates (parameters) might however differ from router to router. For example one maximum allowed data flow of a first router may be set to 1 MB per second, whereas the data flow rate through another router might be set to 5 MB per second.

An operator should only once create a template which comprises the parameter 'maximal allowed data rate' which can then be employed for all routers. The operator must then only specify each parameter setting (each value of a particular maximal allowed data flow rate) for the maximal allowed data rate of each router separately. More generally speaking, an operator or administrator of the network should only once generate a template for monitoring objects which relate to the same component type and then provide individual parameter settings for the parameters specified in the template separately. This reduces dramatically the amount of work an operator has to invest in order to set up the monitoring system.

Furthermore, the administrator of the system should be able to specify the parameter settings in the data file without thinking about the actual implementation of the configuration file as the configuration file is generated later by the integration of the subset of parameter settings into the template. Thus, the provision of the parameter settings via the data file and the parameters via the template for an object provides the advantage that the amount of work the network administrator has to invest in order to set up and configure the monitoring system may be reduced dramatically. Moreover, changes in the notation or structure of the configuration file should be reflected in the corresponding template but not in the data file and have therefore no affect on the parameter settings. This is particularly advantageous when the parameter settings are maintained on a server and provided to an agent while the template is kept on the agent as no changes have to be made on the server in order to adjust the structure and notation of the configuration file.

In accordance with an embodiment of the invention, the subset of parameter settings is retrieved from the data file by applying a first transformation to the data file, wherein the first transformation comprises a set of queries, wherein each query of the set of queries is adapted to extract at least one parameter setting from the plurality of parameter settings. The data file may comprise all parameter settings that are specified by the operator in order to monitor all components of the system. The subset of parameter settings that is required in order to specify the parameters given for monitoring the object are then extracted according to the embodiment by a first transformation from the data file. The first transformation therefore uses a set of queries in order to read out the subset of parameter settings from the data file. The usage of a first transformation provides the advantage that the administrator has to maintain and update only a single data file which holds all parameter settings for all objects that are monitored by the operational management system. The administrator should thus only once provide the corresponding first transformation in order to read out the subset of parameters for a specific object.

In accordance with an embodiment of the invention, the first transformation and the template are predefined for the object. As already mentioned above, the administrator or operator of the network which is managed and monitored by the operational management system has to provide at least once the first transformation in order to retrieve the corresponding subset of parameter settings from the data file. Similarly, the template which comprises the parameters used to monitor the corresponding object has to be provided once for an object.

In accordance with an embodiment of the invention, a second transformation is generated by applying the first transformation to the data file, wherein the second transformation comprises the retrieved subset of parameter settings and rules for integrating each parameter setting of the subset of parameter settings into the template, wherein each parameter setting is integrated into the template by applying the second transformation to the template. The first transformation can be set up in a way that the second transformation is generated from the first transformation when integrating the retrieved subset of parameter settings such that the second transformation comprises rules for integrating each parameter setting of the subset of parameter settings into the template. The rules specify the positions of the parameters in the template and how the retrieved parameter settings have to be assigned to the corresponding parameters.

In accordance with an embodiment of the invention, the configuration file is generated in a first file format, wherein the agent is adapted to process files in the first file format, or wherein the configuration file in the first file format is transformed into the corresponding configuration file in a second file format, wherein the agent or sub-agents associated with the agent are adapted to process files in the second file format. An agent might employ one or more sub-agents which actually perform the monitoring processes. The sub-agents might use different file formats. The agent is therefore adapted to transform the configuration file from the first file format into a file format which can be executed by the corresponding sub-agent.

In accordance with an embodiment of the invention, the data file and the template are provided by a server of the operational management system to the agent, wherein the configuration file is generated by the agent. The template has to be provided once to the agent and can then be kept there. Then only the data file must be provided to the agent when parameter settings in the configuration file have to be changed.

In accordance with an embodiment of the invention, the server is linked with a database, wherein the database holds parameter settings for all parameters used to monitor objects of the operational management system, and wherein the plurality of parameters settings is selected by the server from the database. The plurality of parameter settings might for example be selected such that only the parameters settings required to generate a configuration file are comprised in the plurality of parameter settings. The server must then be aware of which parameter settings are required by a particular agent in order to generate the corresponding configuration files. An advantage of this embodiment is that the data file sent to the agent will be relatively small in size and hence not many network resources need to be employed for the transfer of the data file. According to another example, all parameters will be sent to an agent so that the subset of parameters is selected from all available parameters. This provides the advantage that the server does not have to be aware of the parameter settings required by a particular agent.

In accordance with an embodiment of the invention, the data file is an extensible markup language (XML) data file. The first transformation corresponds to a first extensible stylesheet language transformation (XSLT) stylesheet, wherein each query of the set of queries corresponds to a XML path language (XPath) expression, wherein the second transformation is a second XSLT stylesheet comprising the subset of parameter settings, and wherein the rules for integrating each parameter setting of the subset of parameter settings correspond to XPath expressions, wherein each XPath expression in the second XSLT stylesheet specifies the location for the corresponding parameter setting in the template, wherein the parameter setting is integrated into the corresponding location in the template when the second XSLT stylesheet is applied to the template. The usage of an XML data file provides the advantage that the parameter settings can be structured and organized easily within the data file. Further, the XML data can be easily processed by the use of XSLT stylesheets.

According to a second aspect of the invention, there is provided a computer program product for generating a configuration file. In accordance with an embodiment of the invention, the configuration file specifies how an object of a plurality of objects is to be monitored by an agent of an operational management system. The computer program product comprises computer executable instructions. The instructions are adapted to perform the step of providing a data file comprising a plurality of parameter settings for a plurality of parameters used to monitor the plurality of objects of the operational management system.

The instructions are further adapted to perform the step of retrieving a subset of parameter settings from the plurality of parameter settings, wherein the retrieved subset of parameter settings provides specifications for a subset of parameters of the plurality of parameters, and wherein the subset of parameters is used to monitor the object. The instructions are further adapted to perform the step of generating the configuration file by integrating the subset of parameter settings into a template, wherein the template comprises the subset of parameters, and wherein the parameter settings are assigned to the corresponding parameters.

According to a third aspect of the invention, there is provided a data processing system. In accordance with an embodiment of the invention, the data processing system comprises an agent which is used to monitor an object of a plurality of objects. The data processing system further comprises providing a component for providing a data file comprising a plurality of parameter settings for a plurality of parameters used to monitor the plurality of objects. The data processing system has also a retrieval component for retrieving a subset of parameter settings from the plurality of parameter settings, wherein the retrieved subset of parameter settings providing specifications for a subset of parameters of the plurality of parameters, wherein the subset of parameters is used to monitor the object. The data processing system further comprises a generator for generating a configuration file by integrating the subset of parameter settings into a template, wherein the configuration file specifies how the object of the plurality of objects is to be monitored by the agent, wherein the template comprises the subset of parameters, and wherein the parameter settings are assigned to the corresponding parameters.

In accordance with an embodiment of the invention, the data processing system is an operational management system used for monitoring the plurality of objects.

BRIEF DESCRIPTION OF THE DRAWINGS

Embodiments of the invention will now be described in greater detail, by way of non-limiting example only, with reference to the accompanying drawings in which.

SUMMARY OF THE INVENTION

Figure 1:
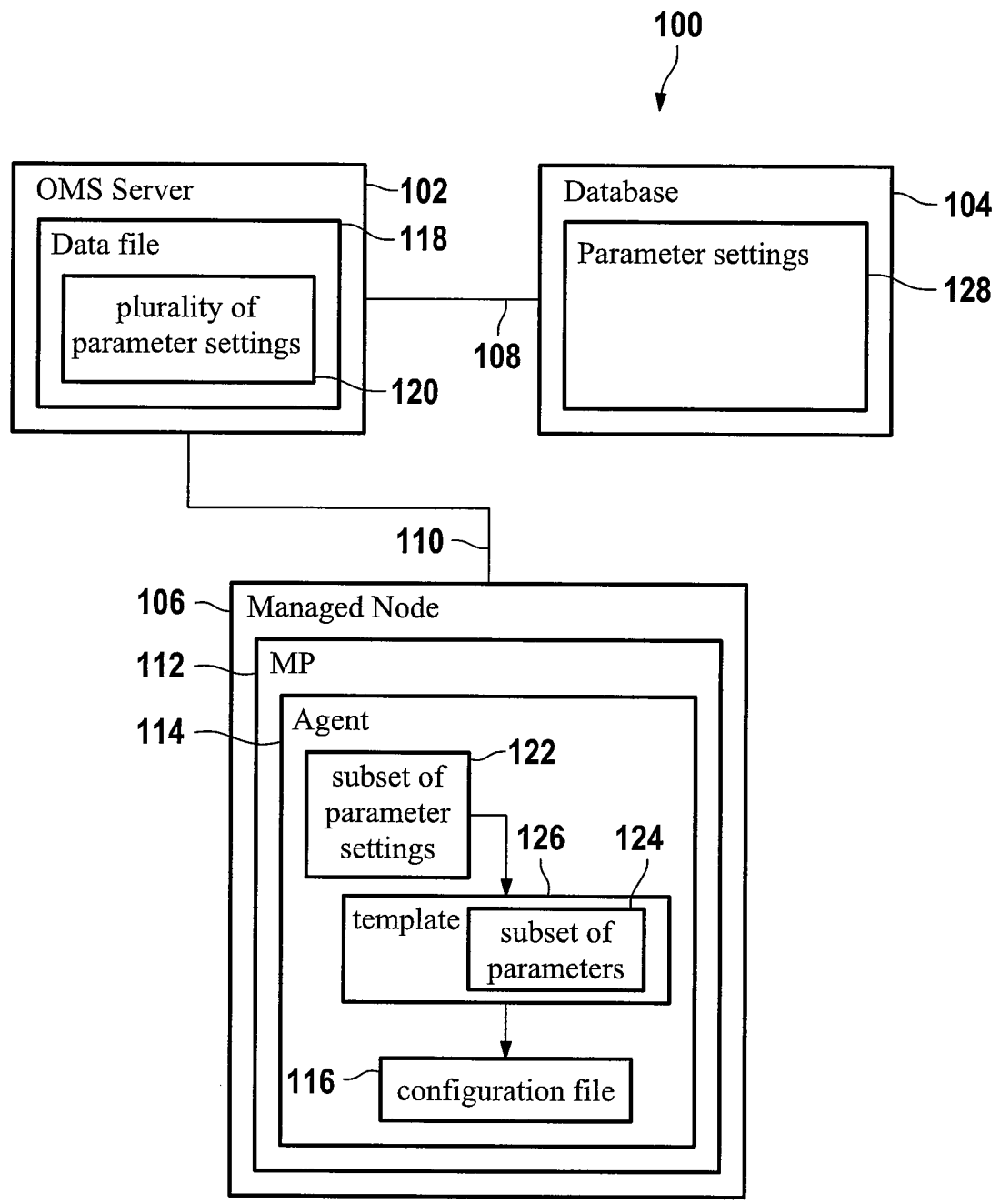
FIG. 1 shows a schematic block diagram of a network.

FIG. 1 shows a schematic block diagram of a network 100. The network 100 comprises an operational management system server 102, a database system 104, and a managed node 106. The operational management server 102 is a component of an operational management system and also a node of the network 100. The operational management system server 102 corresponds to a computer system that is used as a server for the operational management system which is employed to monitor the managed node 106. The database system 104, also denoted simply as database, is also a computer system that provides storage space, e.g., for the operational management system server 102. The managed node 106 corresponds also to a computer system and has a microprocessor 112. The operational management system server 102 is connected with the database 104 via connection 108 and with the managed node 106 via connection 110. The connections 108 and 110 can for example be LAN connections and enable communication and transfer of data between the operational management system server 102, the database 104, and the managed node 106.

An agent 114 is executed by the microprocessor 112. The agent 114 is part of the operational management system and is installed on the managed node 106 in order to monitor the managed node 106. In order to perform monitoring of the managed node 106, the agent 114 needs a configuration file 116. The configuration file 116 provides detailed information for the agent such as parameters and parameters settings for the parameters according to which the agent 114 monitors the managed node 106.

The managed node 106 can for example be a router which is monitored by the agent 114. The information provided by the configuration file 116 might then, for example, instruct the agent 114 to monitor the actual data flow rate through the router and to send an alert message to the server 102 if the actual data flow rate exceeds 10 MB per second. The data flow rate is then one of the parameters comprised in the configuration file, whereby the parameter setting for this parameter is 10 MB per second. According to this example, the parameter setting can be regarded as a value which is provided for the corresponding parameter. A parameter setting may, for example, be a numerical value, an alphanumeric value representing a number or an alphanumeric character, a string of alphanumeric characters, etc. depending on the type of the corresponding parameter.

According to another example, the managed node 106 is a database system with several storage devices (not shown in FIG. 1). The agent 114 can then be used to detect a break down of a storage device. The configuration file 116 might then provide information for the agent 114 on how to detect a failure of a storage device. The information might comprise a parameter which relates to the mode of operation of the storages device, whereby the parameter setting of this parameter would specify the mode of operation as either 'active' or 'inactive'. In this sense, the configuration file could instruct the agent 114 to send an alert message to the server 120 if the agent 114 detects that the mode of operation (provided as parameter) is set to inactive (provided as parameter setting for this parameter). According to this example, the parameter setting can be regarded as a non-numerical value which is provided for the corresponding parameter.

According to a further example, the managed node 106 executes a computer program (not shown in FIG. 1). The agent 114 might be employed to monitor the execution of this computer program. The configuration file 116 might then provide information for the agent 114 how to detect a hang up or other failure of the computer program. The information might comprise a parameter which relates to the mode of operation (program running correctly/program hang up) of the computer program, whereby the parameter setting for this parameter would specify the mode of operation as either 'running correctly' or 'hang up'. In this sense, the configuration file could instruct the agent 114 to send an alert message to the server 120 if the agent 114 detects that the mode of operation (provided as parameter) corresponds to 'hang up' (provided as parameter setting for this parameter).

According to an embodiment of the invention, as described with reference to FIG. 1, the agent 114 is adapted to generate the configuration file 116 by itself. For this, the operational management system server 102 provides a data file 118 to the agent 114. The data file 118 comprises a plurality of parameter settings 120. The agent 114 receives the data file 118 and retrieves a subset of parameter settings 122 from the plurality of parameter settings 120. The subset of parameter settings 122 provides the specifications for a subset of parameters 124 employed by the agent 114 to monitor the managed node 106. The subset of parameters 124 is incorporated into a template 126 which is held by the agent 114. The retrieved subset of parameter settings 122 is then integrated into the template 126 in such a way that each parameter setting of the subset of parameter settings 122 is assigned to the corresponding parameter. Further, by integrating the subset of parameter settings 122 into the template 126, the agent 114 generates the configuration file 116. The configuration file 116 can be directly generated in a first file format which is useable or executable by the agent 114 such that the configuration file 116 can be directly employed by the agent 114 to monitor the managed node 106.

As mentioned before, the plurality of parameter settings 120 from which the subset of parameter settings 122 is retrieved is provided by the operational management system server 102 by use of the data file 118. The operational management system server 102 is therefore adapted to retrieve the plurality of parameter settings 120 from a collection of parameter settings 128 stored on the database 104. The collection of parameter settings 128 relate to the full set of parameter settings for all parameters employed by the operational management system. The operational management system server 102 thus retrieves according to an embodiment of the invention only the plurality of parameter settings 120 that are required by the agent 114 for monitoring the managed node 106. This provides the advantage that the data file 118 will be rather small in size. Hence, the data file 118 will not negatively affect the network traffic when it is transferred from the server 102 to the managed node 106. Another advantage is that due to the small size, the managed node 106 must only provide a relative small amount of storage space for the data file 118. This might become relevant when the managed node 106 is a network component that has only small storage space available, e.g., when the managed node 106 corresponds to a router.

Alternatively, the plurality of parameter settings 120 corresponds to the collection of parameter settings 128. Hence, all available parameter settings employed by the operational management system are given to the agent 114. This provides the advantage that the operational management system server 102 needs not to be adapted to select the plurality of parameter settings 120 which comprises the parameter settings relevant to the agent 114 out of the collection of parameter settings 128 as the selection of the subset of parameter settings 122 from all available parameter settings is done by the agent 114.

The subset of parameter settings 122 might correspond to the plurality of parameter settings 120, especially when the agent 114 only needs to generate one configuration file. It might however well be that the agent 114 employs two or more sub-agents for monitoring. This is further elaborated in the description of FIG. 3. Each of the sub-agents requires then its own configuration file. Each configuration file usually comprises a different subset of parameters and hence different subsets of parameter settings must be retrieved from the plurality of parameter settings 120. Further, each sub-agent might require the configuration file to be in a particular file format. The agent 114 is therefore adapted to generate the configuration file in the corresponding file format or to transform the configuration file from an initial file format (the first file format) into the corresponding file format.

Figure 2:
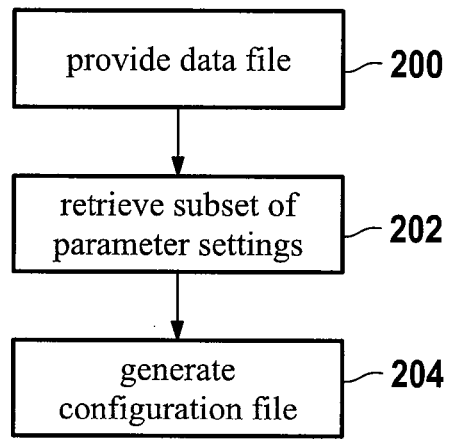
FIG. 2 is a flowchart of an embodiment of the method in accordance with the invention.

FIG. 2 is a flowchart of an embodiment of the method in accordance with the invention. In step 200, a data file is provided which comprises a plurality of parameter settings for a plurality of parameters used to monitor a plurality of objects of an operational management system. In step 202, a subset of parameter settings is retrieved from the plurality of parameter settings. The retrieved subset of parameter settings provides specifications for a subset of parameters of the plurality of parameters, wherein the subset of parameters is used to monitor an object of the plurality of objects. In step 204, a configuration file is generated by integrating the subset of parameter settings into a template, wherein the template comprises the subset of parameters, and wherein the parameter settings are assigned to the corresponding parameters, wherein the configuration file specifies how the object is to be monitored by an agent of the operational management system.

Figure 3:
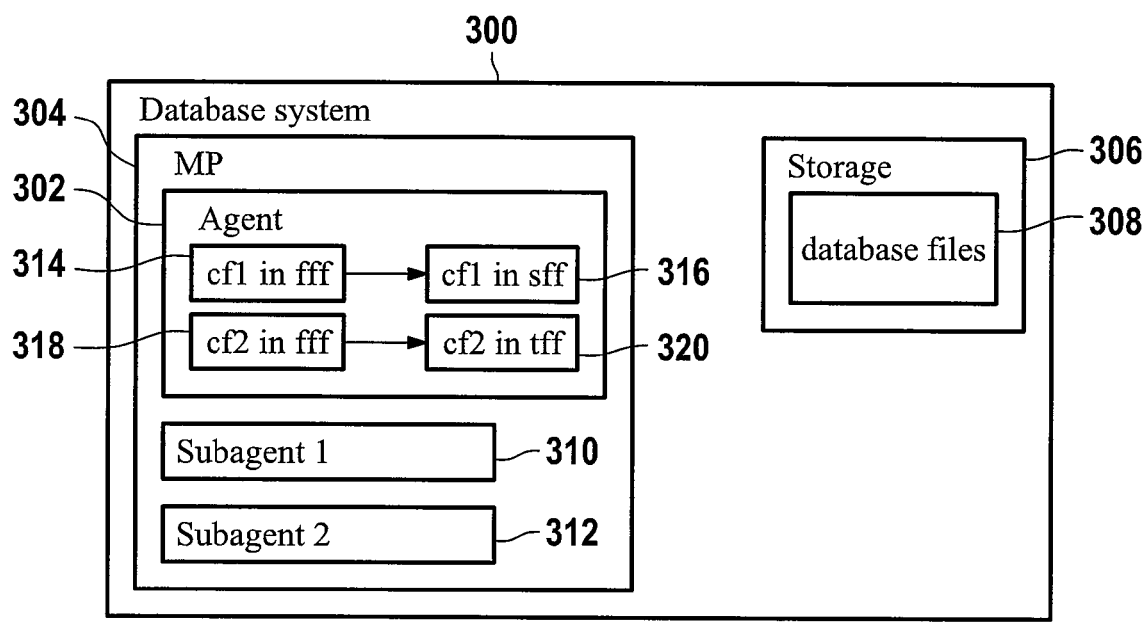
FIG. 3 shows schematically a block diagram of a database system monitored by an agent of an operational management system.

FIG. 3 shows a schematic block diagram of a database system 300 monitored by an agent 302 of an operational management system. The database system 300 can for example be a further node of the network shown in FIG. 1. The database system 300 comprises a microprocessor 304 and storage 306. The storage 306 holds database files 308 which are maintained and organized by the database system 300. The agent 302 is executed by the microprocessor 304.

In order to monitor the database system 300, the agent 302 employs a first sub-agent 310 and a second sub-agent 312 executed by the microprocessor 304. The first sub-agent 310 requires a first configuration file 316 in a second file format which provides instructions for the monitoring of the database system. The first sub-agent 310 might for example be employed to monitor the filling level of the storage 306. For this, parameters (e.g. the maximal allowed filling level) and parameter settings (e.g. a maximal allowed filling level of 90%) have to be provided in the first configuration file according to which the filling level is monitored. Similarly, the second sub-agent 312 might for example be employed to monitor the number of requests received by the database system 300 from other nodes. For this parameters and corresponding parameter settings (e.g. allowed maximal number of requests=1000 per sec.) have to be provided in a second configuration file 320 in a third file format.

In order to generate the first configuration file 316, the agent receives a data file which comprises a plurality of parameter settings. The plurality of parameter settings comprises the parameter settings required to specify the parameters employed by the first and second sub-agent 310, 312. A first subset of parameter settings is then retrieved which comprises the parameter settings required to specify the parameters employed by the first sub-agent 310. A first configuration file 314 in a first file format is then generated by integrating the first subset of parameter settings into a first template which comprises the corresponding parameters. The agent 302 then transforms the first configuration file 314 in the first file format into the first configuration file 316 in the second file format.

In order to generate the second configuration file 320, a second subset of parameter settings is retrieved from the plurality of parameter settings which comprises the parameter settings required to specify the parameters employed by the second sub-agent 312. A second configuration file 318 in the first file format is then generated by integrating the first subset of parameter settings into a first template which comprises the corresponding parameters. The agent 302 then transforms the second configuration file 318 in the first file format into the second configuration file 320 in the third file format.

The agent 302 then transfers the first and second configuration files 316, 320 to the first and second subagents 310, 312, respectively. The subagents 310 and 312 then employ the configuration files 310 and 312, respectively, for monitoring purposes.

Figure 4:
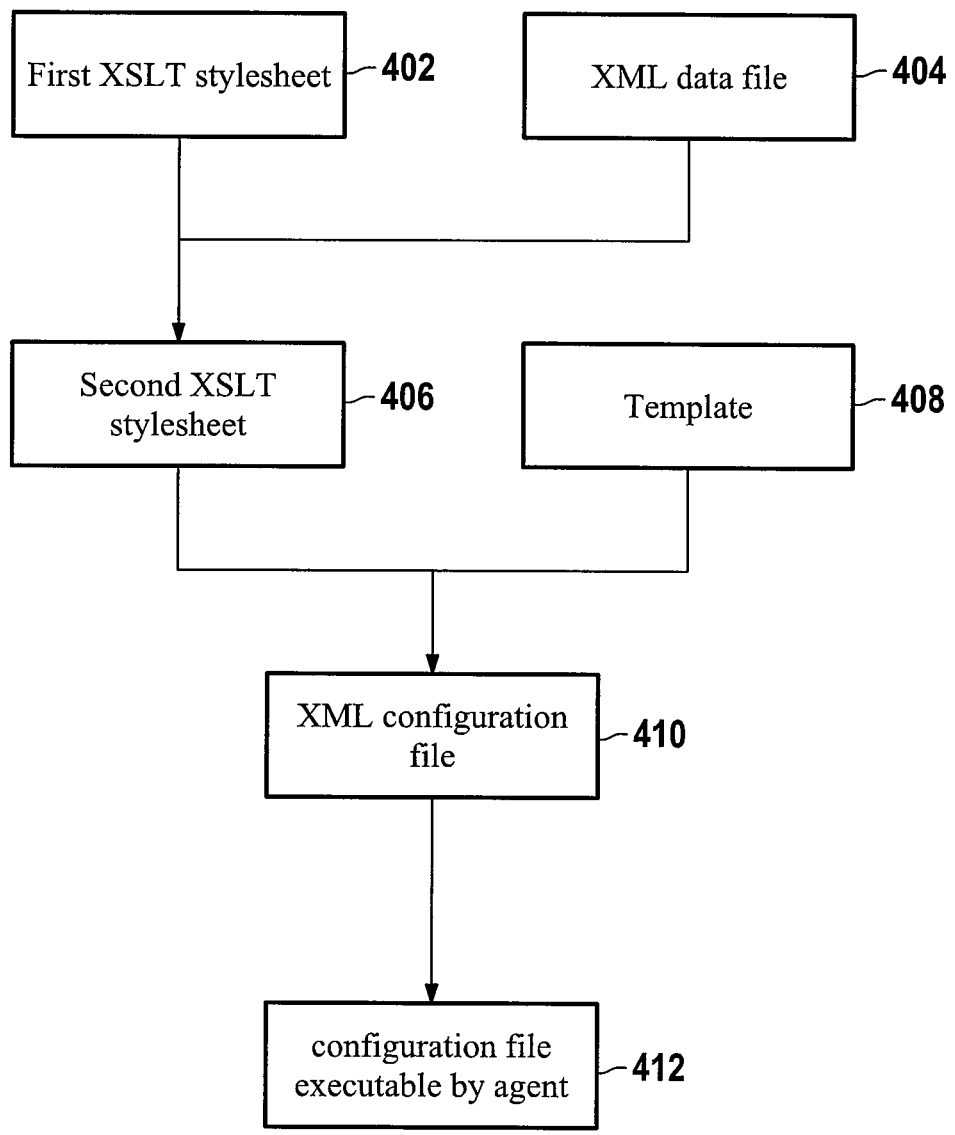
FIG. 4 illustrates how the configuration file is generated according to an embodiment of the invention.

FIG. 4 illustrates how a configuration file is generated according to an embodiment of the invention. A first extensible stylesheet language transformation (XSLT) stylesheet 402 is defined for the configuration file, wherein XPath expressions as references to parameter settings provided by an XML data file 404 are defined. The first XSLT stylesheet 402 is then applied to the XML data file 404, whereby a second XSLT stylesheet 406 is generated. The XPath expressions of the first XSLT Stylesheet have extracted the corresponding parameter settings from the XML data file 404. The extracted parameter settings are stored in the second XSLT stylesheet 406. The second XSLT stylesheet 406 also comprises XPath expressions which refer to locations in a configuration file template 408. The second XSLT stylesheet 406 is applied to the configuration file template 408. The XPath expressions referring to locations in the template 408 take care of integrating the corresponding parameter settings into the locations. The result is an XML configuration file 410. The XML configuration file 410 is finally transformed in a configuration file 412 having a file format which is executable by an agent.

List Of Reference Numerals

| | |
|---|---|
| 100 | Network |
| 102 | Operational management system server |
| 104 | Database system |
| 106 | Managed node |
| 108 | Connection |
| 110 | Connection |
| 112 | Microprocessor |
| 114 | Agent |
| 116 | Configuration file |
| 118 | Data file |
| 120 | Plurality of parameter settings |
| 122 | Subset of parameter settings |
| 124 | Subset of parameters |
| 126 | Template |
| 128 | Collection of parameter settings |
| 300 | Database system |
| 302 | Agent |
| 304 | Microprocessor |
| 306 | Storage |
| 308 | Database files |
| 310 | First sub-agent |
| 312 | Second sub-agent |
| 314 | First configuration file in first file format |
| 316 | First configuration file in second file format |
| 318 | Second configuration file in first file format |
| 320 | Second configuration file in second file format |
| 402 | First XSLT stylesheet |
| 404 | XML data file |
| 406 | Second XSLT stylesheet |
| 408 | Configuration file template |
| 410 | XML configuration file |
| 412 | Configuration file |

The invention claimed is:

1. A method of generating a configuration file, the configuration file specifying how an object of a plurality of objects is to be monitored by an agent of an operational management system, the method comprising:

providing at least one data file comprising a plurality of parameter settings for a plurality of parameters used to monitor the plurality of objects of the operational management system;

retrieving a subset of parameter settings from the plurality of parameter settings, the retrieved subset of parameter settings providing specifications for a subset of parameters of the plurality of parameters, the subset of parameters being used to monitor the object;

generating the configuration file by integrating the subset of parameter settings into a template, wherein the template comprises the subset of parameters, and wherein the parameter settings are assigned to the corresponding parameters.

2. The method of claim 1, wherein the subset of parameter settings is retrieved from the data file by applying a first transformation to the data file, wherein the first transformation comprises a set of queries, wherein each query of the set of queries is adapted to extract at least one parameter setting from the plurality of parameter settings.

3. The method of claim 2, wherein the first transformation and the template are predefined for the object.

4. The method of claim 3, further comprising generating a second transformation by applying the first transformation to the data file, the second transformation comprising the retrieved subset of parameter settings and rules for integrating each parameter setting of the subset of parameter settings into the template, wherein each parameter setting is integrated into the template by applying the second transformation to the template.

5. The method of claim 1, wherein the configuration file is generated in a first file format, wherein the agent is adapted to process files in the first file format, or wherein the configuration file in the first file format is transformed into the corresponding configuration file in a second file format, wherein the agent is adapted to process files in the second file format.

6. The method of claims 1, wherein the data file and the template are provided by a server of the operational management system to the agent, wherein the configuration file is generated by the agent.

7. The method of claim 6, wherein the server is linked with a database, wherein the database holds parameter settings for all parameters used to monitor objects of the operational management system, wherein the plurality of parameter settings is selected by the server from the database.

8. The method of claim 1, wherein the data file is a XML data file, wherein the first transformation corresponds to a first Extensible Stylesheet Language Transformations (XSLT) stylesheet, wherein each query of the set of queries corresponds to a XPath expression, wherein the second transformation is a second XSLT stylesheet comprising the subset of parameter settings, and wherein the rules for integrating each parameter setting of the subset of parameter settings corresponds to at least one XPath expression, wherein each XPath expression in the second XSLT stylesheet specifies the location for the corresponding parameter setting in the template, wherein the parameter setting is integrated into the corresponding location in the template when the second XSLT stylesheet is applied to the template.

9. A computer program product comprising computer executable instructions, the instructions being adapted to perform the method according to claim 1.

10. A data processing system for generating a configuration file, the configuration file specifying how an object of a plurality of objects is to be monitored by an agent, the data processing system comprising:

a first computer that provides at least one data file, the at least one data file comprising a plurality of parameter settings for a plurality of parameters used to monitor the plurality of objects;

a second computer coupled to the first computer, said second computer retrieves a subset of parameter settings from the plurality of parameter settings, the retrieved subset of parameter settings providing specifications for a subset of parameters of the plurality of parameters, the subset of parameters being used to monitor the object; and the second computer generates the configuration file by integrating the subset of parameter settings into a template, wherein the template comprises the subset of parameters, and wherein the parameter settings are assigned to the corresponding parameters.

* * * * *

UNITED STATES PATENT AND TRADEMARK OFFICE
CERTIFICATE OF CORRECTION

PATENT NO. : 8,762,355 B2
APPLICATION NO. : 12/018514
DATED : June 24, 2014
INVENTOR(S) : Bernd Gutjahr et al.

Page 1 of 1

It is certified that error appears in the above-identified patent and that said Letters Patent is hereby corrected as shown below:

In the Claims

In column 10, line 38, in Claim 6, delete "claims" and insert -- claim --, therefor.

Signed and Sealed this
Third Day of February, 2015

Michelle K. Lee
*Deputy Director of the United States Patent and Trademark Office*